United States Patent
Wang (10) Patent No.: US 11,018,870 B2
(45) Date of Patent: May 25, 2021

(54) BIOMETRIC VERIFICATION PROCESS USING CERTIFICATION TOKEN

(71) Applicant: Visa International Service Association, San Francisco, CA (US)

(72) Inventor: Quan Wang, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/635,304

(22) PCT Filed: Aug. 10, 2017

(86) PCT No.: PCT/US2017/046362
§ 371 (c)(1),
(2) Date: Jan. 30, 2020

(87) PCT Pub. No.: WO2019/032113
PCT Pub. Date: Feb. 14, 2019

(65) Prior Publication Data
US 2020/0382306 A1    Dec. 3, 2020

(51) Int. Cl.
*H04L 29/06*    (2006.01)
*H04L 9/32*    (2006.01)
*H04L 9/06*    (2006.01)

(52) U.S. Cl.
CPC .......... *H04L 9/3231* (2013.01); *H04L 9/0637* (2013.01); *H04L 9/3236* (2013.01); *H04L 2209/38* (2013.01); *H04L 2209/56* (2013.01)

(58) Field of Classification Search
CPC ... H04L 9/3231; H04L 9/3236; H04L 9/0637; H04L 2209/38; H04L 2209/56
See application file for complete search history.

(56) References Cited

U.S. PATENT DOCUMENTS

| | | | | |
|---|---|---|---|---|
| 2009/0328218 | A1* | 12/2009 | Tsurukawa | H04L 9/3247 726/23 |
| 2015/0095999 | A1* | 4/2015 | Toth | H04L 63/061 726/6 |
| 2015/0244690 | A1 | 8/2015 | Mossbarger | |
| 2016/0012465 | A1* | 1/2016 | Sharp | G06Q 20/386 705/14.17 |
| 2016/0283920 | A1 | 9/2016 | Fisher et al. | |
| 2016/0300234 | A1* | 10/2016 | Moss-Pultz | H04L 9/3263 |
| 2017/0085562 | A1 | 3/2017 | Schultz et al. | |

(Continued)

FOREIGN PATENT DOCUMENTS

| KR | 1020160037520 | 4/2016 |
|---|---|---|
| WO | 2017044554 | 3/2017 |

OTHER PUBLICATIONS

PCT/US2017/046362 , "International Search Report and Written Opinion", dated May 10, 2018, 11 pages.

*Primary Examiner* — Mahfuzur Rahman
(74) *Attorney, Agent, or Firm* — Kilpatrick Townsend & Stockton LLP (57) ABSTRACT

A method for performing biometric authentication is disclosed. In one example, the method includes obtaining first and second biometric templates and comparing them to determine if they match. The method also includes determining if a biometric certification token is valid. A computing device or other device may communicate with a verification system to determine the validity of the biometric certification token.

9 Claims, 6 Drawing Sheets

(56) References Cited

U.S. PATENT DOCUMENTS

| | | | |
|---|---|---|---|
| 2017/0232300 A1* | 8/2017 | Tran .................. | G16H 20/30 |
| | | | 434/247 |
| 2017/0249482 A1* | 8/2017 | Takaai ............... | H04L 9/3263 |
| 2017/0257358 A1* | 9/2017 | Ebrahimi ............ | H04L 9/3247 |
| 2018/0078843 A1* | 3/2018 | Tran .................. | A61B 5/0024 |
| 2018/0117446 A1* | 5/2018 | Tran .................. | H04L 9/3236 |
| 2018/0117447 A1* | 5/2018 | Tran .................. | G16H 80/00 |
| 2018/0152297 A1* | 5/2018 | Fielding ............ | H04L 9/3297 |
| 2018/0227130 A1* | 8/2018 | Ebrahimi ............ | H04L 9/3236 |
| 2018/0264347 A1* | 9/2018 | Tran .................. | G06F 3/00 |
| 2019/0020468 A1* | 1/2019 | Rosenoer ............ | H04L 63/0414 |
| 2019/0171849 A1* | 6/2019 | Assenmacher ....... | G06F 21/64 |
| 2020/0145219 A1* | 5/2020 | Sebastian ............ | H04L 63/0861 |

\* cited by examiner

BIOMETRIC VERIFICATION PROCESS USING CERTIFICATION TOKEN

BACKGROUND

A number of conventional systems and methods for biometric authentication exist.

In some instances, a reference biometric template for a user may be stored at a remote server computer. When the user wants to conduct a transaction, a local access device may receive a biometric along with a device identifier or the like, and convert the biometric into a biometric template. The biometric template is then transmitted to the remote server computer for verification. The remote server computer can compare the received sample biometric template to a reference biometric sample template to determine if the user is in an authentic user. If the user is authentic, then the user may be allowed to continue with the interaction that the user's desired interaction.

A number of problems are associated with storing the reference biometric template at the remote server computer. First, in the above-described system, the sample biometric template needs to be transmitted to the remote server computer. Because the sample biometric template includes sensitive information, complex encryption or data security schemes need to be implemented to protect the sample biometric template as it is transmitted to the remote server computer. Also, there can be unexpected network events (e.g., network outages, server failures) that can prevent or delay the transmission of the sample biometric template to the remote server computer. Such network events may problematically preclude any authentication process from proceeding.

In other instances, a reference biometric template may be stored on a local device such as a mobile phone. The mobile phone can receive a biometric and convert it to a sample biometric template. The mobile phone can then compare the sample biometric template to the reference biometric template stored on the mobile phone. While this type of authentication process can be adequate in some cases, in other cases, it is not adequate. For example, in this type of local authentication process, an external party such as a bank, governmental agency, or merchant, is not able to rely on the verification that is performed solely on the mobile phone. That is, the external party cannot rely on the verification performed by the mobile phone, since the external party does not know if the reference biometric template was in fact authentic and does not know if the verification process was properly conducted.

Embodiments of the invention address these and other problems, individually and collectively.

BRIEF SUMMARY

Embodiments of the invention are directed to methods and systems for performing biometric verification.

One embodiment of the invention is directed to a method comprising: receiving, by a computing device, data stored on a portable device, the data comprising a first biometric template associated with a user and a biometric certification token; receiving, by the computing device, a biometric of the user; converting, by the computing device, the biometric of the user into a second biometric template; comparing, by the computing device or the portable device, that the first biometric template and the second biometric template match; verifying, by the computing device, with a verification system, that the biometric certification token is valid; and allowing a transaction to proceed when the first biometric template matches the second biometric template, and the biometric certification token is valid.

Another embodiment of the invention is directed to a computing device. The computing device comprises: a processor; and a computer readable medium, the computer readable medium comprising code, executable by the processor, to implement a method comprising: receiving, by the computing device, data stored on a portable device, the data comprising a first biometric template associated with a user and a biometric certification token; receiving, by the computing device, a biometric of the user; converting, by the computing device, the biometric of the user into a second biometric template; comparing, by the computing device or the portable device, that the first biometric template and the second biometric template match; verifying, by the computing device, with a verification system, that the biometric certification token is valid; and allowing a transaction to proceed when the first biometric template matches the second biometric template, and the biometric certification token is valid.

Another embodiment of the invention is directed to receiving, by an computing device, a biometric; converting, by the computing device, the biometric to a biometric template; hashing, by the computing device, the biometric template; and transmitting, by the computing device, the hashed biometric template to a verification system, wherein the verification system signs the hashed biometric template to form a biometric certification token and stores the biometric certification token.

These and other embodiments of the invention are described in further detail below.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "server computer" may include a powerful computer or cluster of computers. For example, the server computer can be a large mainframe, a minicomputer cluster, or a group of servers functioning as a unit. In one example, the server computer may be a database server coupled to a Web server.

A server computer may be coupled to a database and may include any hardware, software, other logic, or combination of the preceding for servicing the requests from one or more client computers. A server computer may comprise one or more computational apparatuses and may use any of a variety of computing structures, arrangements, and compilations for servicing the requests from one or more client computers.

An "application program interface" or "API" may include software specifying how components of a system should interact. The API may comprise a set of routines, protocols, and tools on which software applications may be built. An API may be used for a web-based system, operating system, database system, computer hardware or software library, and may include specifications for routines, data structures, object classes, variables and/or remote calls.

"Authentication" may include a process for verifying an identity of something (e.g., a user). One form of authentication can be biometric authentication.

A "biometric" may be any human characteristic that is unique to an individual. For example, a biometric may be a person's fingerprint, voice sample, face, DNA, retina, etc.

A "biometric reader" may include a device for capturing data from an individual's biometric. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include to a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

A "blockchain" can be a distributed database that maintains a continuously-growing list of records secured from tampering and revision. A blockchain may include a number of blocks of interaction records. Such interaction records may include any suitable information, including biometric templates, biometric samples, data derived from biometric samples or templates (e.g., hashes of biometric samples or templates), user identifiers, device identifiers (e.g., portable device or access device identifiers), time stamps associated with interactions, etc. In some cases, each block in the blockchain can also include a timestamp and a link to a previous block. For example, each block may include or be appended to a hash of the previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a verification network. Any node within the verification network may subsequently use the blockchain to verify transactions. The security of a blockchain may be obtained using a cryptographic scheme.

A blockchain system may include a computer system that includes one or more nodes, and that maintains one or more blockchains.

A "digital signature" may include a type of electronic signature that encrypts documents with digital codes that are particularly difficult to duplicate. A digital signature may include data used to provide assurance or evidence as to the origin and identity of an electronic record or message. Digital signatures can be based on public key cryptography (i.e. asymmetric cryptography). Digital signatures may be generated using a public key algorithm such as RSA. To create a digital signature, signing software may be used to create a one-way hash of electronic data that is to be signed by a signing entity. A private key of the signing entity is then used to encrypt the hash and form the digital signature. In other cases, a symmetric key of a symmetric key pair can be used to create a digital signature.

The term "validation" may include the act of checking or affirming that information is legitimate. An example may be the act of checking that a digital signature appended to an electronic record is, in fact, legitimate and was signed by the entity that alleges creation of the digital signature. In some embodiments, digital signatures may be validated according to a verification algorithm in conjunction with a signing entity's public key. In other cases, if underlying data was signed using a symmetric key of a symmetric key pair, the signature can be validated with the corresponding symmetric key.

An "electronic identity" or "eID" may include a unique string of characters or symbols used to identify an individual. In some embodiments, the electronic identity may be mathematically derived from information associated with a user. For example, in some embodiments, an electronic identity may be a value calculated by hashing one or more input values (customer name, country code, etc.) available to multiple entities. In this way, the electronic identity may be independently generated by any entity that has the prerequisite information. An electronic identity may be altered (e.g., hashed and/or encrypted) information associated with a user. For example, in some embodiments, an electronic identity may be derived from a combination of a country code, customer name, date of birth, and last four digits of a social security number such as SHA256(USA*JOHN SMITH*19700101*1234). Hashing this value may result in a seemingly random string of characters, such as 754WD2E2513BF546050C2D079FF5D65AB6E318E and this can be an electronic identity. In some embodiments, the electronic identity is associated with a passphrase that is provided in order to access any interaction record associated with the electronic identity. An electronic identity may sometimes be referred to as an "eID," electronic identifier, or electronic identification data.

An "account identifier" may refer to a sequence of numbers and/or letters for identifying an account. The account can be a bank account, credit card account, government benefit account, health insurance account, etc. One example of an account identifier may be a primary account number (PAN), which may be a 16-digit number used to identify that a user may use to conduct transactions.

A "computing device" may be any suitable device that can receive and process data. Examples of computing devices may include access devices, transport computers, processing network computers, or authorization computers.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. An access device may also include a biometric reader for reading a biometric, and forming a biometric sample. The biometric sample may then be converted to a biometric template by the access device.

An "authorization request message" may be an electronic message that requests authorization for a transaction. In some embodiments, it is sent to a transaction processing computer and/or an issuer of a payment card to request authorization for a transaction. An authorization request message, according to some embodiments, may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "portable device" can be a device that is easily transportable. It can be hand-held and compact. For example, a portable device may fit into a user's wallet and/or pocket (e.g., pocket-sized). Some exemplary portable devices may include smart cards, ordinary credit or debit cards (with a magnetic strip), keychain devices (such as the Speedpass™ commercially available from Exxon-Mobil Corp.), etc. Other examples of portable devices include cellular phones, personal digital assistants (PDAs), pagers, payment cards, security cards, access cards, smart media, transponders, vehicles (e.g., cars, boats, motorcycles, etc.), wearable devices (e.g., smart watch, smart jewelry, smart clothing, etc.) and the like. The portable devices can also be debit devices (e.g., a debit card), credit devices (e.g., a credit card), or stored value devices (e.g., a stored value card).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "resource providing entity" may be an entity that may make resources available to a user. Resource providing entities may also be known as resource providers. Examples of resource providing entities include resource providers, vendors, suppliers, owners, traders, wallet providers, service providers, and the like. In some embodiments, such entities may be a single individual, small groups of individuals, or larger groups of individuals (e.g., companies, governmental agencies). Resource providing entities may be associated with one or more physical locations (e.g., supermarkets, malls, stores, etc.) and online platforms (e.g., e-commerce websites, online companies, etc.). In some embodiments, resource providing entities may make available physical items (e.g., goods, products, etc.) to the user. In other embodiments, resource providing entities may make available digital resources (e.g., electronic documents, electronic files, etc.) to the user. In other embodiments, resource providing entities may manage access to certain resources by the user. In some embodiments, the resources may be services (e.g., digital wallet services).

An "access request" may include a request for access to a resource. The resource may be physical resources (e.g., goods), digital resources (e.g., electronic document, electronic data, etc.), or services. In some cases, an access request may be submitted by transmission of an access request message that includes access request data. Typically, a device associated with a requestor may transmit the access request message to a device associated with a resource provider.

"Access request data" may include any suitable information surrounding or related to an access request. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

An "access token" may include a substitute identifier for a real credential that can allow access to a resource. An access token may include a series of alphanumeric characters that may be used as a substitute for an original account identifier. In some cases, the access token may be a payment token, which may include an identifier for a payment account that is a substitute for a real account identifier, such as a primary account number (PAN). For example, an access token "4900 0000 0000 0001" may be used in place of a PAN "4147 0900 0000 1234." In some embodiments, an access token may be "format preserving" and may have a numeric format that conforms to the account identifiers used in existing processing networks (e.g., ISO 8583 financial transaction message format). In some embodiments, an access token may be used in place of a PAN to initiate, authorize, settle, or resolve a payment transaction. The access token may also be used to represent the original credential in other systems where the original credential would typically be provided. In some embodiments, a token value may be generated such that the recovery of the original PAN or other account identifier from the token value may not be computationally derived.

A "biometric certification token" may include data that indicates that a biometric sample or biometric template has been certified by a verification system. The biometric certification token may be in any suitable form. In some embodiments, the biometric certification token may be a biometric template that has been hashed and then signed using an encryption key of the verification system.

A "gateway" may refer to a node in a computer network that is a key stopping point for data on its way to or from other networks. A gateway can include protocol converters, proxy servers, routers, firewalls, etc. A gateway may also be referred to as a "network gateway." For example, a computer that controls the traffic from an Internet Service Provider (ISP) may be a network gateway. An entry point to a private blockchain network may be a blockchain gateway.

Details of some embodiments of the present invention will now be described.

Figure 1:
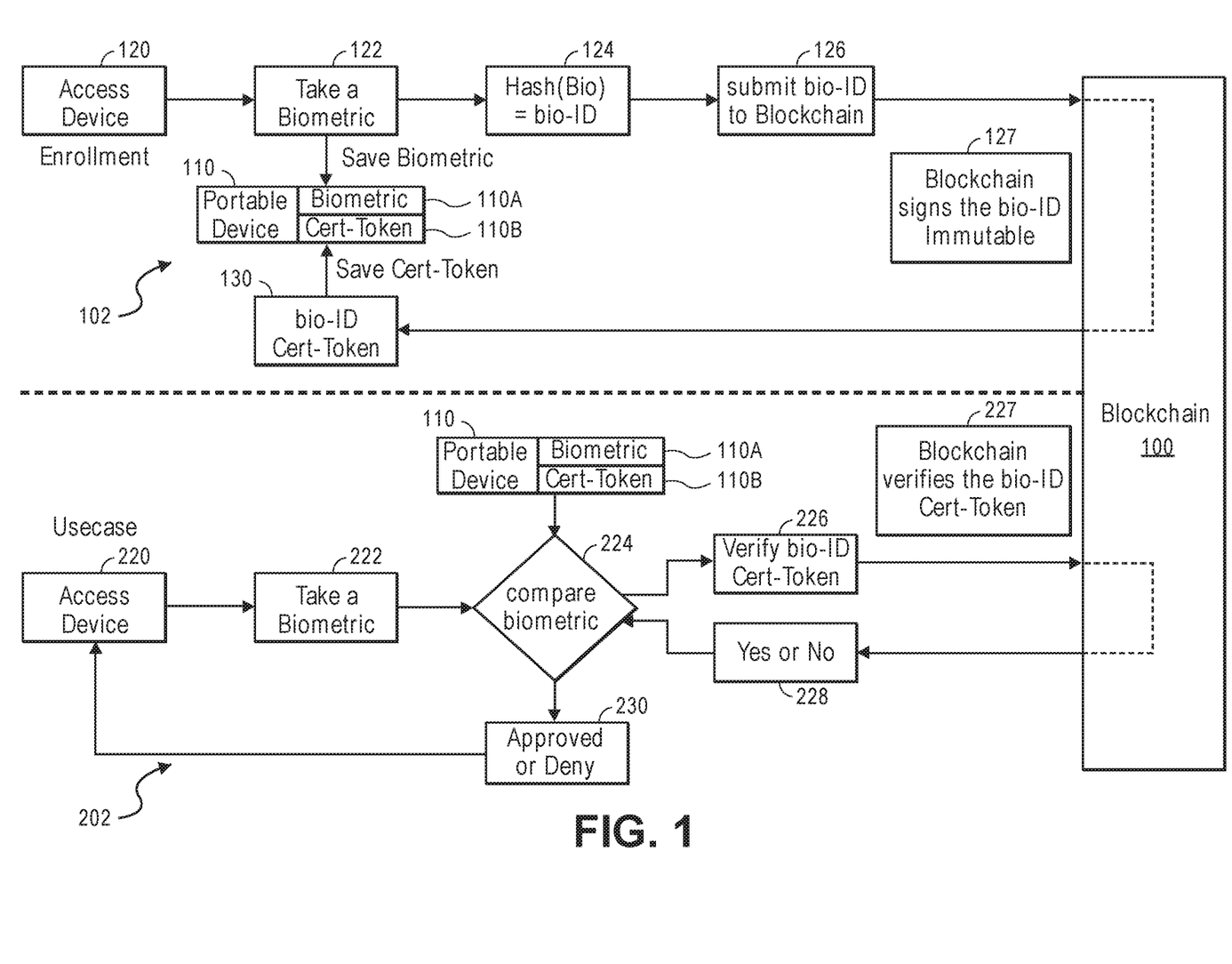
FIG. 1 shows a block diagram illustrating some system components as well as a data flow and decision process according to embodiments of the invention.

FIG. 1 shows a block diagram illustrating some system components as well as a data flow and decision process according to embodiments of the invention. The diagram in FIG. 1 can be separated into an enrollment process and system 102, and a transaction process and system 202. Both processes and systems 102, 202 utilize a blockchain 100.

Figure 2:
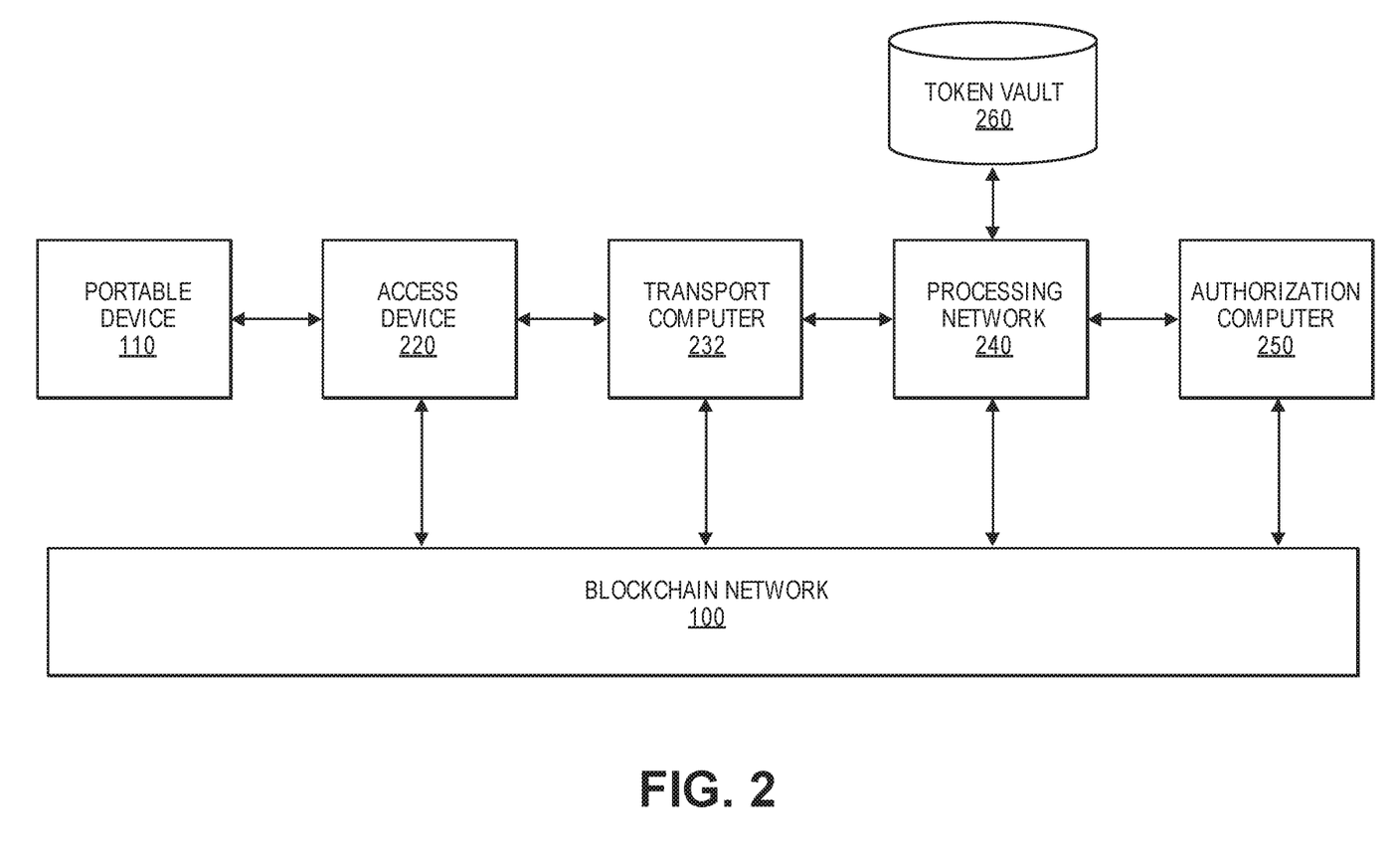
FIG. 2 shows a block diagram of a transaction system according to an embodiment of the invention.
Figure 3:
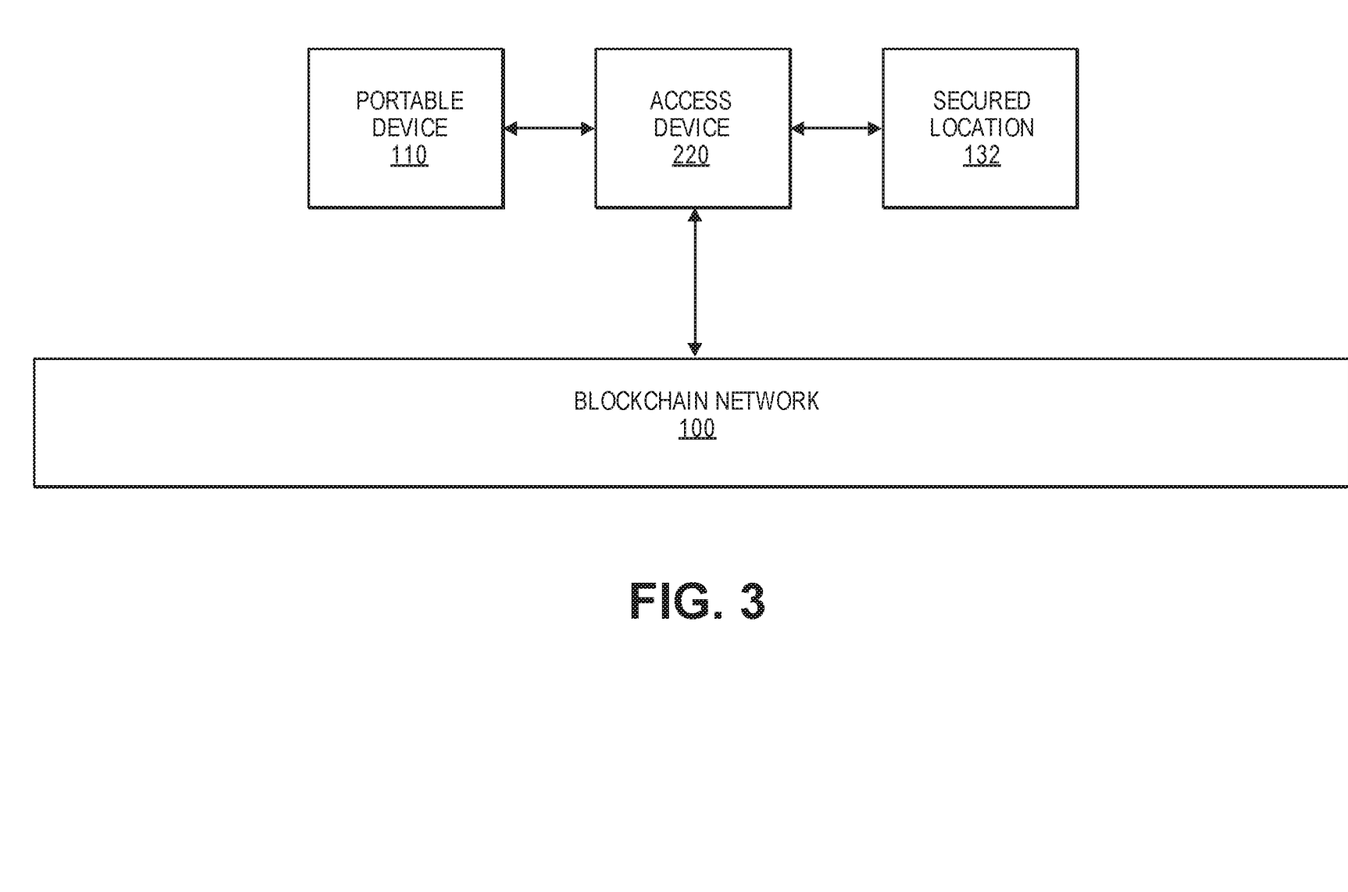
FIG. 3 shows a block diagram of a system for allowing a user to access a secure location.
Figure 4:
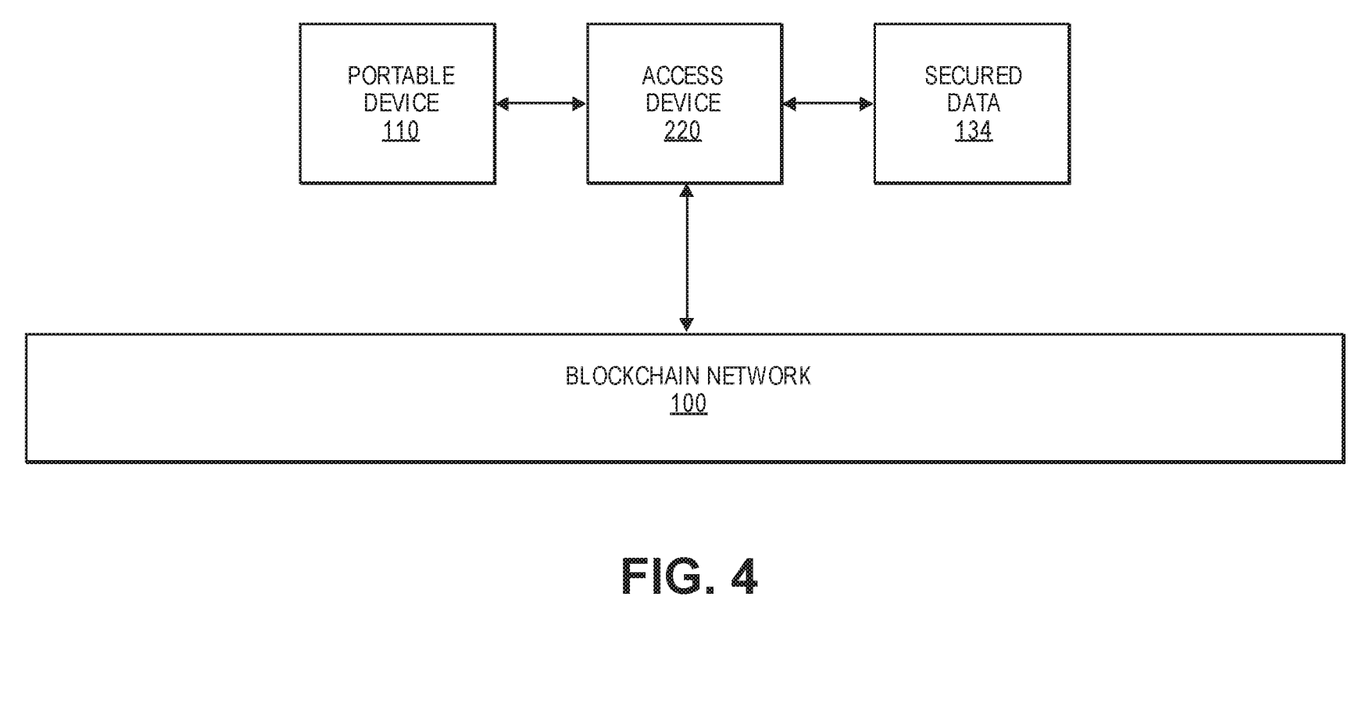
FIG. 4 shows a block diagram of a system for allowing a user to access secure data.

The various components shown in FIG. 1, as well as FIGS. 2, 3, and 4 may utilize a communications network. The communications network may follow a suitable communication protocol to generate one or more secure communication channels. A communication channel may, in some instances, comprise a "secure communication channel," which may be established in any known manner, including the use of mutual authentication and a session key and establishment of an SSL session. However, any method of creating a secure channel may be used. By establishing a secure channel, sensitive information may be securely transmitted.

Any suitable communications protocol may be used for generating a communications channel. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices described in FIG. 1, 2, 3, or 4 can be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The enrollment process and system 102 in FIG. 1 can utilize an access device 120, a portable device 110 in the form of a smart card, and a blockchain system 100. The blockchain system 100 may include a computer network that includes a number of nodes. Each node may store a copy of a blockchain and may update its copy of the blockchain when it needs to be updated.

In the example shown in FIG. 1, access devices 120, 220 and various actions performed by the access devices 120, 220 are shown and described for purposes of illustration. It is understood, however, that the methodology may apply to any suitable type of computing device. For example, the methods described could be performed by other devices such as transport computers, processing network computers, and authorization computers.

A method performed by the enrollment process and system 102 can include receiving, by the access device 120, a biometric from a user. This is illustrated in block 122. The access device 120 many include a biometric reader. The biometric reader may scan, read, or otherwise capture a biometric (e.g., a voiceprint, a facial image, a retinal scan, etc.) from the user.

The access device 120 then converts the biometric to a biometric sample, and then to a reference biometric template 110A, and then stores the reference biometric template 110A in a portable device 110 that is in communication with the access device 120. In some embodiments, the portable device 110 may be in contact or contactless communication with the access device 120. For example, the portable device 110 may be in the form of a card that is inserted into a slot in the access device 120, such that the portable device 110 and the access device 120 communicate through electrical contacts in the respective devices 110, 120. In another example, the access device 120 may be in short-range wireless communication with the portable device 110, using infrared or RF signals. Protocols such as Bluetooth (classic and Bluetooth Low Energy), NFC (near field communications), and Wi-Fi may also be used.

After the access device 120 has obtained the reference biometric template 110A, the access device 120 can then hash the reference biometric template 110A. This is illustrated in block 124. Any suitable well known hashing algorithm may be used. Examples include SHA1, SHA2, and SHA256.

After the access device 120 hashes the reference biometric template, the access device 120 then transmits the hashed biometric template (or hashed biometric reference template) to a verification system, which in some embodiments can be the blockchain system 100. This is illustrated in block 126. In some embodiments, other data (e.g., a device ID, an EID, a primary account number, a token, etc., in either clear text or in encrypted form) may accompany the hashed biometric template and may be eventually stored in the blockchain along with the biometric certification token (and optionally the hashed biometric template). Still further, other information such as the contact information (e.g., phone number, e-mail address, physical address) of the user of the portable device 110 may be sent with the hashed biometric template.

After receiving the hashed biometric template, the blockchain system 100 or a computer or entity affiliated with the blockchain system 100, may perform an optional identity verification process. For example, the blockchain system 100 or a computer or entity affiliated with the blockchain system 100 may contact the user of the portable device 110 to confirm their identity. The confirmation process may be similar to a KYC or "know your customer" verification process used in the banking industry. In other embodiments, the blockchain system 100 or a computer or entity affiliated with the blockchain system 100 may communicate directly with the user of the portable device 110 to obtain the biometric template and additional information about the user though a different communication channel, without utilizing the access device 120. After the blockchain system 100 is confident that the hashed biometric template that it received is authentic, it signs the hashed biometric template with an encryption key to form a biometric certification token and may then store it along with the hashed biometric template. This is shown in block 127.

In some embodiments, the encryption key that is used to sign the hashed biometric template may be a private key of a public-private key pair. In this example, a subsequently used access device receives the biometric certification token may verify that the blockchain system previously signed the hashed biometric template using a public key corresponding to the private key to form the biometric certification token. In other embodiments, the encryption key may be a symmetric key of a symmetric key pair. In such embodiments, if a user uses the portable device 110 at another access device (e.g., 220) to conduct a transaction at a later time, the access device may need to contact the blockchain system 100 to verify that the blockchain system 100 previously signed the hashed biometric template to form the biometric certification token. Any private or symmetric keys may be stored in one or more secure memory elements in any nodes in the blockchain system 100.

In some embodiments, a gateway computer (not illustrated) may provide access to the blockchain 100. The gateway computer may perform the above-described user verification processes and digital signature processes.

The signed and stored hashed biometric template may then be stored as a record within a blockchain in the blockchain system 100. Multiple copies of the blockchain may be stored in multiple nodes of the blockchain system 100. The record may include the signed hashed biometric template as well as other data that can correlate to the user and/or the portable device. Such other data may include a credential such as an account number associated with the portable device, a user ID such as an EID, a PAN, a device ID of the portable device 110, etc. In some embodiments, the blockchain system 100 and the blockchain being maintained does not contain any sensitive information, and might contain only the signed hashed biometric template and the hashed biometric template. This advantageously protects the privacy of the reference biometric template, while also allowing for the blockchain system 100 to perform a verification function. The use of the blockchain system 100 also allows any suitable party to interact with it to confirm the validity of the biometric certification token 110B. In this regard, the blockchain 100 can be a publicly accessible blockchain, or it could be a private blockchain that is only accessible by a select number of entities.

The biometric certification token 110B can then be transmitted by the blockchain system 100 to the portable device 110 used by the user. In some embodiments, if the portable device 110 is capable of long-range communication, the portable device 110 may receive the biometric certification token 110B directly from the blockchain 100. In other embodiments, the biometric certification token 110B may be transmitted to the access device 120, and the access device 120 may write the biometric certification token to the portable device 110. This is shown in block 130. After this time, the biometric certification token 110B is stored in the portable device 110 along with the reference biometric template 110A. Both of these pieces of data may then be used by the user to conduct subsequent transactions.

Once the portable device 110 stores the reference biometric template 110A and the biometric certification token 110B, the portable device 110 may be used to conduct a transaction. As shown in the transaction process and system 202, the access device 220 may receive data stored on a portable device 110, the data comprising the reference biometric template 110A (an example of a first biometric template) associated with a user and the biometric certification token 110B. The access device 220 may be the same or different than access device 120 that was used to perform the enrollment process.

The method of conducting the transaction may also include receiving, by the access device 220, a biometric of the user. This is shown in block 222. As explained above, a reader in the access device 220 may capture a biometric of the user, and the access device may then convert it to a biometric sample. The access device 220 may then convert the biometric sample of the user into a second biometric template.

The portable device 110 may also communicate with the access device 220, and may thereafter obtain the reference biometric template 110A and the biometric certification token 110B. For example, the portable device 110 may be in the form of a card that is inserted into a slot in the access device 220. In another example, the access device 220 may be in wireless communication with the portable device 110, using infrared or RF signals. Protocols such as Bluetooth (classic and Bluetooth Low Energy), NFC (near field communications), and Wi-Fi may also be used. The portable device 110 may transmit the reference biometric template 110A and the biometric certification token 110B to the access device 220. Other data on the portable device 110 may also be transmitted to the access device 220. Such data may include a user identifier (e.g., an EID), an account number, or a device identifier.

After the access device 220 has obtained the reference biometric template 110A and the second biometric template, it may compare them as shown in decision block 224. If access device 220 determines that the reference biometric template does not match the second biometric template, then the access device may deny the transaction. If the access device 220 determines that the reference biometric template 110A does match the second biometric template, then the access device 220 may determine whether or not the reference biometric template was in fact certified by the blockchain system 100. The match determination may be based upon a predetermined match threshold between the reference biometric template and the second biometric template. For example, if greater than 80 or 90 percent of the distinct features in the reference biometric template and the second biometric template match, then the match may be considered successful.

In some embodiments, instead of the access device 220 comparing the reference biometric template 110A and the second biometric template, the portable device 110 may compare them and come to a determination as to whether a match or no match is present. The match or no match result can be passed to the access device 220 after the comparison is performed. In such embodiments, the access device 220 may forward the second biometric template to the portable device 110 before the portable device 110 performs the match process.

In some embodiments, the access device 220 may transmit the biometric certification token 1106 to the blockchain system 100. This is shown in block 226. The blockchain system 100 may then verify the biometric certification token 1106. This is shown in block 227. For example, if the biometric certification token was previously signed using a symmetric key of a symmetric key pair, then the blockchain system 100 may verify that the biometric certification token 1106 is valid by decrypting it to obtain the hashed reference biometric template. It may then compare the obtained hashed biometric template with the hashed biometric template stored on the blockchain of the blockchain system 100. If the hashes match, then the blockchain system 100 may transmit a message back to the access device 220 indicating that the biometric certification token 1106 is valid. After the access device 220 determines that the reference biometric template 110A matches the second biometric template and determines that the biometric certification token is valid, it may allow the transaction to proceed.

In other embodiments, the access device 220 may send the biometric certification token 1106 to the blockchain system 100. The blockchain system 100 may store or have access to a public key corresponding to the private key used to sign the reference biometric template. The blockchain system 100 may use the public key and a verification algorithm to verify that the biometric certification token was created by the blockchain system 110.

The transmission of the decision as to whether or not the biometric certification token is valid is shown in block 228. The access device's 220 decision to allow the transaction to proceed or not is shown in block 230.

Once the access device 220 determines that it is acceptable to proceed with the transaction, further processing may take place as shown in FIGS. 2, 3, and 4. The biometric verification process can be utilized in conjunction with any suitable types of transactions. Examples of such transactions may include payment transactions, location access transactions, and data access transactions.

FIG. 2, shows components in a transaction processing system associating to an embodiment of the invention. It may include the portable device 110, the access device 220, a transport computer 232, a processing network 240, and an authorization computer 250 all in operative communication with each other. The transport computer 232 may be operated by an entity such as an acquirer and the authorization computer 250 may be operated by an entity such as an issuer. The processing network 240 may be operated by a payment processor, and may be operatively coupled to an access token vault 260.

The access device 220 may by operated by a resource provider such as a merchant. The merchant may offer goods or services to the user of the portable device 110. The transport computer 232 may be operated by an entity such as an acquirer. The authorization computer 250 may be operated by an entity such as an issuer of a payment account associated with the portable device 110.

Processing network 240 may include data processing subsystems, networks, and operations used to support and deliver authorization services, exception file services, and clearing and settlement services. Processing network may operate a payment processing network. An exemplary payment processing network may include VisaNet™. Processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

After the access device 220 has determined that the user and the portable device 110 have been authenticated, the access device may generate an authorization request message. The authorization request message may then be transmitted to the transport computer 232, and then to the processing network 240. If the processing network 240 determines that the authorization request message contains an access token such as a payment token, it may contact the token vault 260 to obtain a real credential (e.g., a primary account number of PAN). The access token in the authorization request message may be replaced with the real credential, and a modified authorization request message containing the real credential may be transmitted to the authorization computer 250.

The authorization computer 250 may determine if the transaction should be authorized. It may perform appropriate fraud checks and/or may determine if there are sufficient funds or credit in the account associated with the real credential to authorize the transaction.

After the authorization computer 250 makes a decision as to authorization, it may generate an authorization response message. The authorization response message may be transmitted to the processing network 240. The processing network 240 may contact the token vault to obtain the access token associated with the real credential in the authorization response message, if the original authorization request message contained an access token. The processing network may modify the authorization response message and may transmit it to the access device 220 via the transport computer 232.

At the end of the day, or at any other suitable period of time, a clearing and settlement process may occur between the transport computer 232, the processing network 240, and the authorization computer 250.

In some embodiments, the previously described biometric certification token 1106 may be included in the authorization request or response messages. If desired, any of the entities including the access device 220, the transport computer 232, the processing network 240, or the authorization computer 250 may contact the blockchain network 100 to determine if the biometric certification token 1106 is valid.

FIG. 3 shows another system according to an embodiment of the invention. In FIG. 3, the access device 220 may be used access a secure location 132. The secure location 132 may be, for example, a transit station, a building, a secure location within a building, etc. The biometric verification process can occur substantially as described with respect to FIG. 1. Upon successful verification of the user of the portable device 110, the user may be allowed to access the secured location 132.

FIG. 4 shows another system according to an embodiment of the invention. In FIG. 4, the access device 220 may be used access secure data 134. The secure data 134 may include, for example, medical records, sensitive financial data, personal identifiable information, etc. The biometric verification process can occur substantially as described with respect to FIG. 1. Upon successful verification of the user of the portable device 110, the user may be allowed to access the secured data 134.

Figure 5:
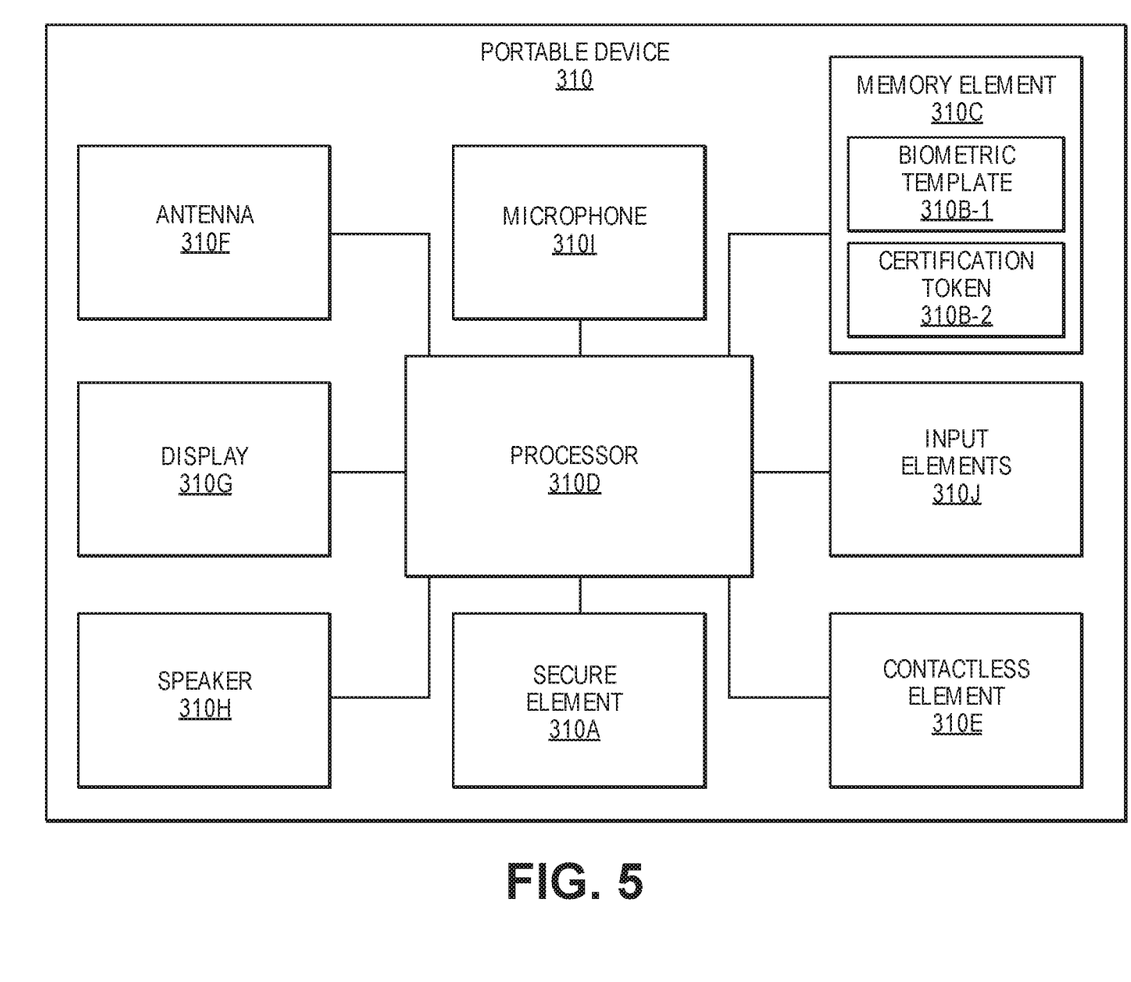
FIG. 5 shows a block diagram of a portable device according to some embodiments of the invention.

FIG. 5 depicts a block diagram of an exemplary portable device 310. FIG. 5 shows a number of components. A portable device 310 according to embodiments of the invention may comprise any suitable combination or subset of such components.

Portable device 310 may include a processor 310D (e.g., a microprocessor) for processing functions of portable device 310. One exemplary function enabled by processor 310D includes processing functions of display 310G to allow a user to see information (e.g., interfaces, contact information, messages, etc.). Processor 310D may include hardware within portable device 310 that can carry out instructions embodied as code in a computer-readable medium.

An exemplary processor may be a central processing unit (CPU). As used herein, a processor can include a single-core processor, a plurality of single-core processors, a multi-core processor, a plurality of multi-core processors, or any other suitable combination of hardware configured to perform arithmetical, logical, and/or input/output operations of a computing device.

Portable device 310 may comprise a secure element 310A. Secure element 310A may be a secure memory on portable device 310 such that the data contained on secure element 310A cannot easily be hacked, cracked, or obtained by an unauthorized entity. Secure element 310A may be utilized by portable device 310 to host and store data and applications that may require a high degree of security. Secure element 310A may be provided to portable device 310 by a secure element issuer. Secure element 310A may be either embedded in the handset of portable device 310 or in a subscriber identity module (SIM) card that may be removable from portable device 310. Secure element 310A can also be included in an add-on device such as a micro-Secure Digital (micro-SD) card or other portable storage device.

Secure element 310A may store any suitable sensitive information. For example, secure element 310A may store access data (e.g., account information, token information, etc.) associated with a user. Other information that may be stored in secure element 310A may include user information or user data (e.g., name, date of birth, contact information, etc.). In other embodiments, some, none, or all of the foregoing information may be stored in memory element 310C or may be stored at a remote server computer (e.g., in the cloud).

Portable device 310 may comprise a memory element 310C (e.g., computer readable medium). Memory element 310C may be present within a body of portable device 310 or may be detachable from the body of portable device 310. The body of portable device 310 may be in the form of a plastic substrate, housing, or other structure. Memory element 310C may store data (e.g., applications, etc.) and may be in any suitable form (e.g., a magnetic stripe, a memory chip, etc.).

Memory element 310C may store the previously described biometric template 310B-1 and the biometric certification token 310B-2. It may also store other information that can be used to identify the user and/or the portable device 310. Such information may include an EID, a PAN, a device ID, etc.

Portable device 310 may further include a contactless element 310E, which may typically be implemented in the form of a semiconductor chip (or other electronic data storage element) with an associated wireless transfer (e.g., data transmission) element, such as an antenna 310F. Contactless element 310E may be associated with (e.g., embedded within) portable device 310. Data or control instructions transmitted via a cellular network may be applied to contactless element 310E by means of a contactless element interface (not shown). In some cases, the contactless element interface may function to permit the exchange of data and/or control instructions between the user device circuitry (and hence the cellular network) and an optional contactless element 310E.

Contactless element 310E may be capable of transferring and receiving data using a near-field communications (NFC) capability (or NFC medium) typically in accordance with a standardized protocol or data transfer mechanism (e.g., ISO 14443/NFC). Portable device 310 may support contactless transactions using the EMV contactless communication protocol (EMV-CCP), which is based on ISO 14443, in order to interact with access devices (e.g., reader devices). This capability may typically be met by implementing NFC. The NFC capability of portable device 310 may be enabled by an embedded NFC chip or by the addition of an external memory card or accessory that contains the NFC chip. NFC capability is a short-range communications capability, such as RFID, Bluetooth®, infra-red, or other data transfer capability that can be used to exchange data between the portable device 310 and an interrogation device. Thus, portable device 310 may be capable of communicating and transferring data and/or control instructions via both cellular network and near-field communications technology.

Portable device 310 may further include an antenna 310F for wireless data transfer (e.g., data transmission). Antenna 310F may be utilized by portable device 310 to send and receive wireless communications. Antenna 310F may assist in connectivity to the Internet or other communications networks and enable data transfer functions. Antenna 310F may enable SMS, USSD, as well as other types of cellular communications, such as voice call and data communications.

Portable device 310 may include a display 310G that may show information to a user. Display 310G may be any suitable screen that enables touch functionality. In some embodiments, display 310G of portable device 310 may display a user interface (e.g., of a mobile application or website) that may allow the user to select and interact with objects presented on display 310G. The objects may include, but may not be limited to, menus, text fields, icons, and keys/inputs on a virtual keyboard.

Portable device 310 may include a speaker 310H, which may be any suitable device that can produce sound in response to an electrical audio signal. Speaker 310H may play recorded sounds, as well as prerecorded messages to communicate with a user. In some cases, the user may be able to receive instructions by voice communications played by speaker 310H to which the user may respond (e.g., by returning voice command, activating input elements, etc.).

Portable device 310 may include a microphone 310I, which may be any suitable device that can convert sound to an electrical signal. Microphone 310I may be utilized to capture one or more voice segments from a user. For example, microphone 310I may allow the user to transmit his or her voice to portable device 310. In some embodiments, the user may utilize voice commands detected by microphone 310I to provide instructions to portable device 310. In some cases, the user may provide voice commands detected by microphone 310I to navigate through mobile application 310B.

Portable device 310 may further include input elements 310J to allow a user to input information into the device. Example input elements 310J include hardware and software buttons, audio detection devices (e.g., microphone), biometric readers, touch screens, and the like. A user may activate one or more of input elements 310J, which may pass user information to portable device 310. In some cases, one or more of input elements 310J may be utilized to navigate through various screens of mobile application 310B.

In some embodiments, where portable device 310 is a phone or other similar computing device, portable device 310 may include a browser stored in the memory element 310C and may be configured to retrieve, present, and send data across a communications network (e.g., the Internet). In such embodiments, portable device 310 may be configured to send data as part of an access request. In some embodiments, portable device 310 may provide the data upon request from another entity (e.g., access device).

In other embodiments, the portable device 310 may be in the form of a smart card. The smart card may include at least the processor 310D, the secure element 310A, the memory element 310C, the biometric template 310B-1, the certification token 310B-2, and the contactless element 310E. The smart card may also include a substrate made primarily of plastic, and information may be printed or embossed on the plastic substrate. Such information may include the user's name, account number, expiration date, and CVV2 code.

Figure 6:
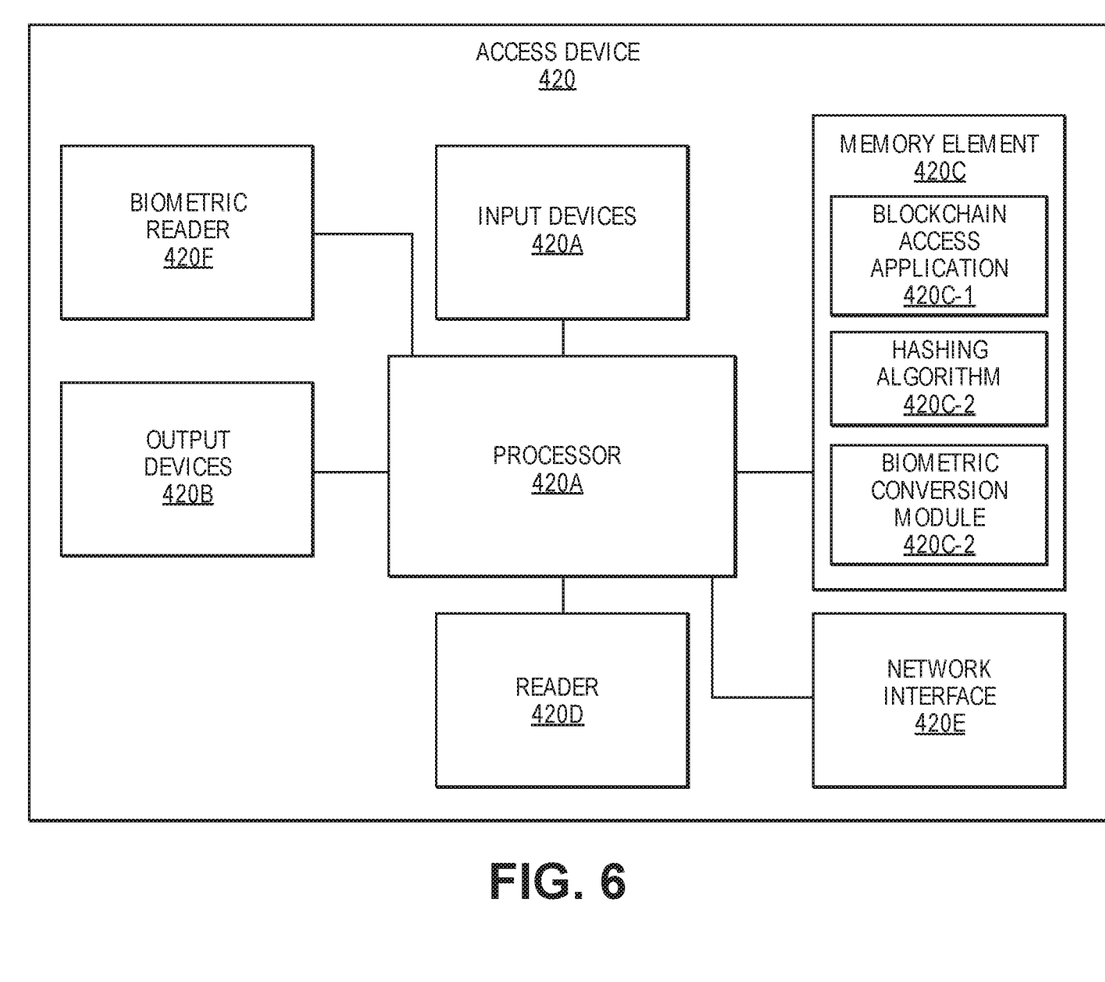
FIG. 6 shows a block diagram of an access device according to an embodiment of the invention.

FIG. 6 shows a block diagram of an exemplary access device 420.

The access device may include a processor 420A. A input devices 420A, output devices 420B, a memory element 420C, a portable device reader 420D, a network interface 420E, and a biometric reader 420F may be operatively coupled to the processor 420A.

The memory element 420C may include a blockchain access application 420C-1. The blockchain access application 420C-1 may include code for interacting with a blockchain system. The memory element 420C may also include a hashing algorithm 420C-2 to generate, in conjunction with the processor 420A, hashes of any biometric templates. The memory element 420C may also include a biometric conversion module 420C-3. The biometric conversion module 420C-3 may be used, in conjunction with the processor 420A, to convert a biometric to a biometric sample, and to convert the biometric sample to a biometric template.

Network interface 420E may be any suitable combination of hardware and software that enables data to be transferred to and from any external computer. Some examples of network interface 420E may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface may include Wi-Fi™.

Data transferred via network interface 420E may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 420E and other devices via a communications path or channel. As noted above, any suitable communications path or channel may be used such as, for instance, a wire or cable, fiber optics, a telephone line, a cellular link, a radio frequency (RF) link, a WAN or LAN network, the Internet, or any other suitable medium.

The biometric reader 420F may be configured to read any suitable type of biometric, which may be converted to a biometric template by the processor 420A. The biometric reader 420F can be in any suitable form, including a camera, a scanner, etc.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of electronic records in order to assess a risk level of an action, an electronic record can also be used to access data or other services. For example, electronic records may be used to gain access to a location or service (e.g., a train ride or concert). In this example, the electronic record may include a transaction record which indicates that a ticket has been associated with an account.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a computing device, data stored on a portable device, the data comprising a first biometric template associated with a user and a biometric certification token, wherein the first biometric template was previously associated with the user by a verification system comprising a blockchain system, and the biometric certification token is a hash of the first biometric template that is signed by the verification system;
receiving, by the computing device, a biometric of the user;
converting, by the computing device, the biometric of the user into a second biometric template;
comparing, by the computing device or the portable device, to determine if the first biometric template and the second biometric template match;
determining, by the computing device or the portable device, that the first biometric template and the second biometric template match;
verifying, by the computing device, with the verification system, that the biometric certification token is valid by determining that the biometric certification token is stored within the blockchain system; and
allowing a transaction to proceed when the first biometric template matches the second biometric template, and the biometric certification token is valid.

2. The method of claim 1, wherein the computing device is an access device, and the portable device is a card.

3. The method of claim 1, wherein the portable device received the biometric certification token from the verification system, prior to the computing device receiving the data.

4. The method of claim 1, wherein the computing device comprises a processor, a reader coupled to the processor, the reader configured to read data from the portable device, and a biometric reader coupled to the processor.

5. The method of claim 1, further comprising:
generating, by the computing device, an authorization request message; and
transmitting, by the computing device, the authorization request message to an authorization computer.

6. A computing device comprising:
a processor; and
a computer readable medium, the computer readable medium comprising code, executable by the processor, to implement a method comprising:
receiving data stored on a portable device, the data comprising a first biometric template associated with a user and a biometric certification token, wherein the first biometric template has been previously associated with the user by a verification system comprising a blockchain system, and the biometric certification token is a hash of the first biometric template that is signed by the verification system;
receiving a biometric of the user;
converting the biometric of the user into a second biometric template;
comparing to determine if the first biometric template and the second biometric template match;
determining that the first biometric template and the second biometric template match;
verifying with the verification system, that the biometric certification token is valid by determining that the biometric certification token is stored within the blockchain system; and
allowing a transaction to proceed when the first biometric template matches the second biometric template, and the biometric certification token is valid.

7. The computing device of claim 6, further comprising: a biometric reader coupled to the processor.

8. The computing device of claim 6, wherein the computing device comprises a network interface coupled to the processor.

9. A method comprising:
receiving, by a computing device, data stored on a portable device, the data comprising a first biometric template associated with a user and a biometric certification token, wherein the first biometric template was previously associated with the user by a verification system comprising a blockchain system;
receiving, by the computing device, a biometric of the user;
converting, by the computing device, the biometric of the user into a second biometric template;
comparing the computing device, to determine if the first biometric template associated with the user and the second biometric template match;
determining, by the computing device, that the first biometric template associated with the user and the second biometric template match;
verifying, by the computing device, with the verification system, that the biometric certification token is valid by determining that the biometric certification token is stored within the blockchain system; and
allowing a transaction to proceed when the first biometric template matches the second biometric template, and the biometric certification token is valid.

* * * * *

UNITED STATES PATENT AND TRADEMARK OFFICE
CERTIFICATE OF CORRECTION

PATENT NO. : 11,018,870 B2  
APPLICATION NO. : 16/635304  
DATED : May 25, 2021  
INVENTOR(S) : Quan Wang Page 1 of 1

It is certified that error appears in the above-identified patent and that said Letters Patent is hereby corrected as shown below:

In the Claims

In Column 18, Line 48, Claim 9, please remove "comparing the computer device," and insert --comparing, by the computer device,--

Signed and Sealed this  
Nineteenth Day of October, 2021

Drew Hirshfeld  
*Performing the Functions and Duties of the*  
*Under Secretary of Commerce for Intellectual Property and*  
*Director of the United States Patent and Trademark Office*